United States Patent
Choy et al.

(10) Patent No.: US 7,099,899 B2
(45) Date of Patent: Aug. 29, 2006

(54) SYSTEM AND METHOD FOR ITEM VERSIONING IN A CONTENT MANGEMENT SYSTEM

(75) Inventors: David Mun-Hien Choy, Los Altos, CA (US); Sudipta Deb Deb, Palo Alto, CA (US); Tawei Hu, San Jose, CA (US); Lily Liang, San Jose, CA (US); Kenneth Carlin Nelson, Hollister, CA (US); Edward Joseph Perry, Cary, NC (US); Mayank Vipin Shah, San Jose, CA (US); I-Shin Andy Wang, Palo Alto, CA (US); Howard Hao Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 10/128,861

(22) Filed: Apr. 23, 2002

(65) Prior Publication Data

US 2003/0200235 A1    Oct. 23, 2003

(51) Int. Cl.
    *G06F 17/30* (2006.01)
(52) U.S. Cl. .................... 707/203; 707/200; 707/201
(58) Field of Classification Search ......... 707/1–104.1, 707/200–205; 712/20; 717/101
    See application file for complete search history.

(56) References Cited

U.S. PATENT DOCUMENTS

| | | | |
|---|---|---|---|
| 4,399,504 A | 8/1983 | Obermarck et al. ........ 364/200 |
| 5,440,732 A * | 8/1995 | Lomet et al. .................. 707/1 |
| 5,574,898 A * | 11/1996 | Leblang et al. ................ 707/1 |
| 5,787,441 A * | 7/1998 | Beckhardt .................... 707/201 |
| 5,893,908 A | 4/1999 | Cullen et al. .................. 707/5 |
| 6,023,710 A | 2/2000 | Steiner et al. .............. 707/204 |
| 6,081,832 A | 6/2000 | Gilchrist et al. ............ 709/206 |
| 6,105,056 A | 8/2000 | Gilchrist et al. ............ 709/206 |
| 6,167,407 A | 12/2000 | Nachenberg et al. ....... 707/203 |
| 6,185,584 B1 | 2/2001 | Paik et al. .................. 707/511 |
| 6,330,589 B1 | 12/2001 | Kennedy .................... 709/206 |
| 6,449,624 B1 * | 9/2002 | Hammack et al. .......... 707/203 |
| 6,557,012 B1 * | 4/2003 | Arun et al. ................. 707/203 |
| 6,631,386 B1 * | 10/2003 | Arun et al. ................. 707/203 |
| 2001/0039545 A1 * | 11/2001 | Nishizawa .................... 707/9 |
| 2002/0188638 A1 * | 12/2002 | Hamscher ................... 707/530 |

* cited by examiner

*Primary Examiner*—Jeffrey Gaffin
*Assistant Examiner*—Neveen Abel-Jalil
(74) *Attorney, Agent, or Firm*—Samuel A. Kassatly

(57) ABSTRACT

A content management system provides versioning capability that can either be controlled by the client application or be transparent thereto. Control of document versions depends on the root and child component attributes that are defined by the hierarchical structure of the document. When a document is updated, the present system performs any or all of the following scenarios as desired by the user: replace the existing attribute values stored in the root component instance for a specified document; replace the existing attribute values stored in a specified child component instance for the specified document; add a new child component instance into the hierarchical structure for the specified document; or delete an existing child component instance from the hierarchical structure for the specified document.

18 Claims, 5 Drawing Sheets

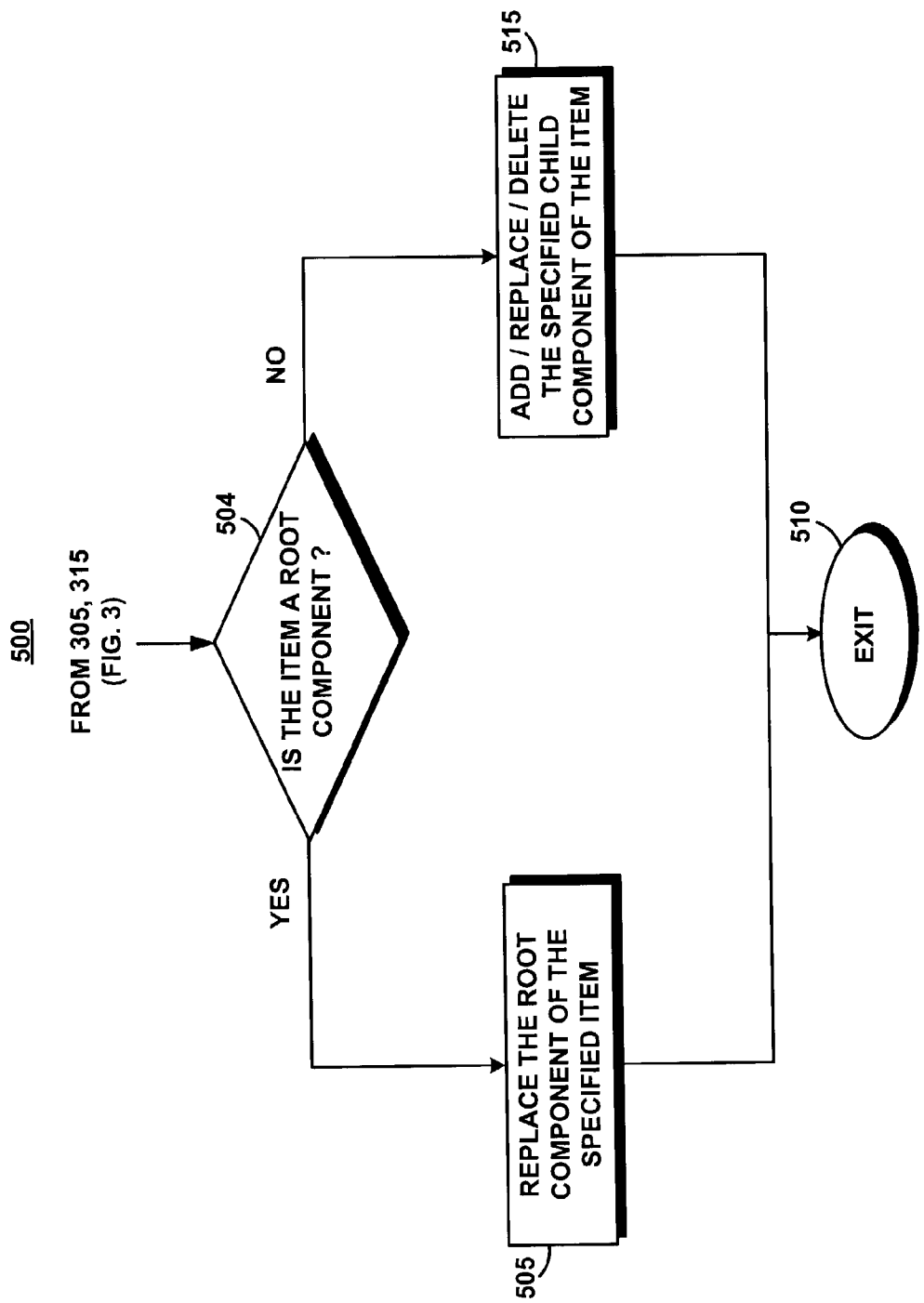

SYSTEM AND METHOD FOR ITEM VERSIONING IN A CONTENT MANGEMENT SYSTEM

FIELD OF THE INVENTION

The present invention generally relates to version control of documents as they are edited or changed, and particularly to a software system and associated method for versioning documents by a content management system. More specifically, this invention pertains to the versioning of documents as defined by the user or by a client application.

BACKGROUND OF THE INVENTION

When creating and editing a document, users may make revisions to update the document or document content. The content management system can create a new version of the document after it has been revised. Older versions of the document can be either saved or deleted when the user creates a new version. However, each save or delete interaction with the server must be managed by the user or the client application.

For many document types, there may be a requirement to retain the previous versions of the document. For other document types, a predetermined number of the latest versions must be maintained. In conventional content-management systems, the client application must explicitly request the creation of a new version of a document (also interchangeably referred to herein as an item). When a user updates the document, the client application must first specify the document identification, or itemID, to be updated, and then indicate whether to replace the existing version of the document or to create a new version for this updated document. Thus, the user or the client application must make the decision on every transaction type for updating a document. Consequently, the user must make a decision whether to save old versions every time a document is edited or revised. However, the user can easily lose track of the changes and revisions.

There is therefore a still unsatisfied need for a content management system that automatically manages document versioning for users and client applications.

SUMMARY OF THE INVENTION

The system and method for item versioning in a content management system according to the present invention satisfy this need. The system and method provide versioning capability in a content management system that can either be controlled by the client application or be transparent to the client application.

Versioning is controlled by the user who may request that the content manager replace the old version of the document or create a new version. The user (or client) also defines the manner in which old versions can be maintained. As an example, the number of previous versions of the document may be limited by the user, or all previous versions of the document may be saved.

The present invention presents several advantages among which are the following:

1. The content server capability is enhanced for managing the version control by document type.
2. The client application complexity is reduced.
3. The required data parameters transmitted across the network communication are reduced.
4. The flexibility of controlling the document versions either by the client application explicitly or by the content server is increased.
5. Versioning control is improved by maintaining compatibility with content management systems that do not have versioning control, by allowing the client application to control the versioning, if necessary.

Control of document versions depends on root and child component attributes that are defined by the hierarchical structure of the document. When a document is updated, the system of the present invention performs any or all of the following scenarios, as desired by the user or user application:

Replace the existing attribute values stored in the root component instance for a specified document;

replace the existing attribute values stored in a specified child component instance for the specified document;

add a new child component instance into the hierarchical structure for the specified document; or delete an existing child component instance from the hierarchical structure for the specified document.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 5 is a flow chart that illustrates the logic flow for a process with the version control inactivated (i.e., "OFF").

DETAILED DESCRIPTION OF PREFERRED EMBODIMENTS

The following definitions and explanations provide background information pertaining to the technical field of the present invention, and are intended to facilitate the understanding of the present invention without limiting its scope:

API (Application Program Interface: A language and message format used by an application program to communicate with the operating system or some other control program, such as a database management system (DBMS) or communications protocol.

Document: An item that can be electronically digitized, such as audio, video, pictures, text, and so forth.

Instance: In object-oriented technology, a member of a class. For example, "Lassie" is an instance of the class "dog." When an instance is created, initial values of its instance variables are assigned.

Internet: A collection of interconnected public and private computer networks that are linked together with routers by a set of standards protocols to form a global, distributed network.

RDBMS: Relational database management system for a database organization method that links files together as required.

Figure 1:
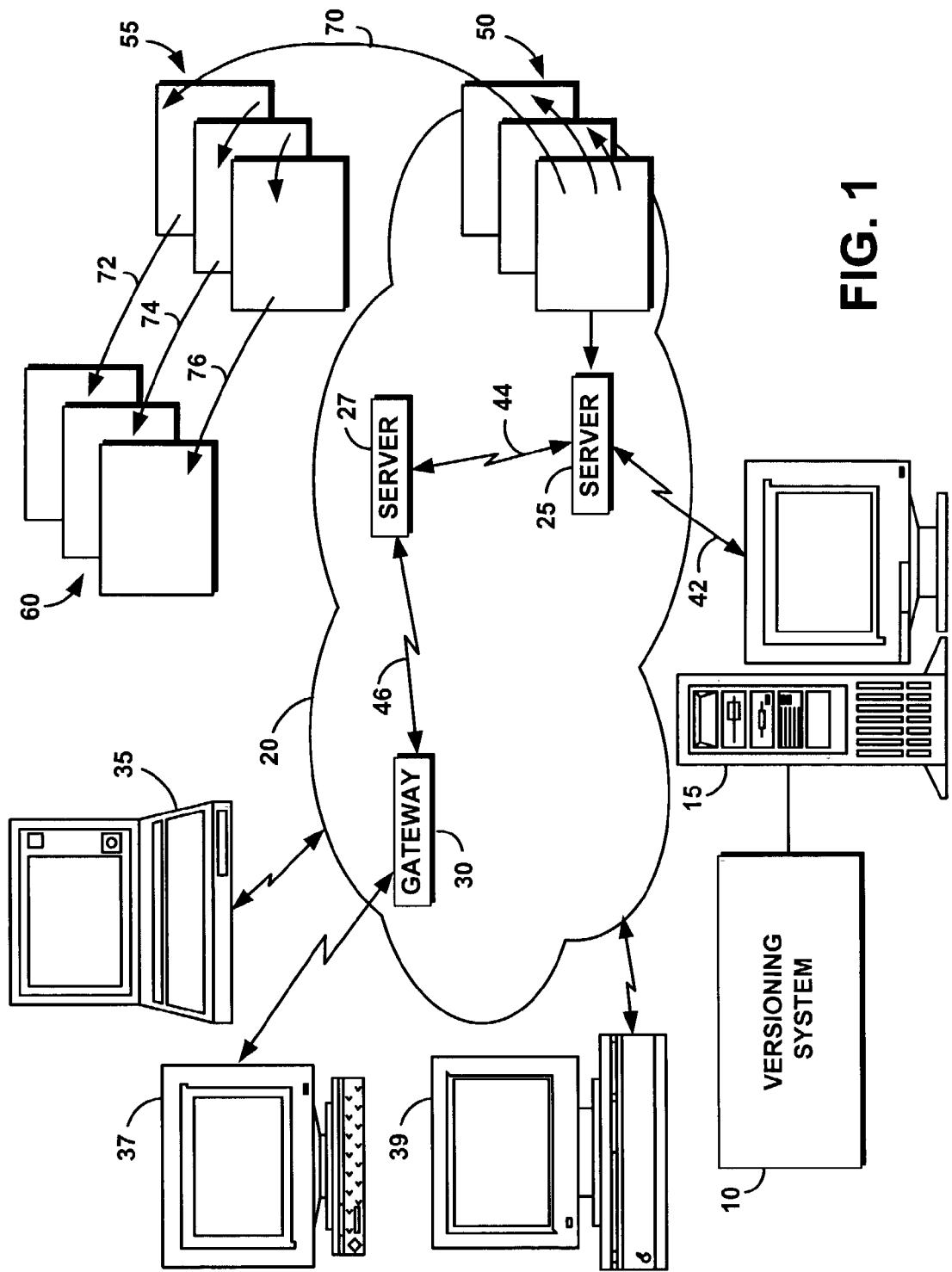
FIG. 1 is a schematic illustration of an exemplary operating environment in which an item versioning implementation in content management system of the present invention can be used.

FIG. 1 portrays the overall environment in which an object-oriented framework for a versioning system 10 in a content management system according to the present invention may be used. The system 10 includes a software or computer program product that is typically embedded within or installed on a host server 15. Alternatively, the system 10 can be saved on a suitable storage medium such as a diskette, a CD, a hard drive, or like devices. While the system 10 will be described in connection with the WWW, the system 10 can be used with a stand-alone database of documents or other text sources that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 25.

With reference to FIG. 2A, in the data model of the versioning system 10, an ItemType (or item type) 200 is a named hierarchical structure of the RDBMS tables, each of which is called a ComponentType of the ItemType 200. Each ComponentType is actually a RDBMS component table. There is always one and only one root ComponentType 205 and zero to many child ComponentTypes, i.e., 206, 207, per ItemType 200. The terminology of the ComponentType and the component table is used interchangeably to describe the operation of the system 10.

With reference to FIG. 2B, an Item (or item) 210 is an instance of the ItemType 200. It is a row stored in a root component table 215 and is also stored in zero to multiple rows in each of the child component tables 220. Thus, each item 210 contains a single root component 215 instance and multiple child component 220 instances.

The Item Type (or Item Type) 200 can be versioned, that is when an item 210 is updated, one or multiple versions of item 210 can be maintained for every item 210, in the ItemType 200. The items 210 share the same ItemID (item identification or item ID) but each has a different version number. Each item 210 is represented by a complex object stored in a hierarchical structure. A single set of attribute values is stored in the root component table 215 and multiple sets of attribute values may be stored in the child component tables 220 for each item 210.

An item type 200 must be defined to the content manager library server 15 via a system administrative function. When the document type is defined, a constant value of the version control indicator (VersionControl) and a constant value of the maximum number of versions (VersionMax) that are allowed for an item type 200, are specified by a client system administrator and stored into the Item Type 200 definition table for each document type. VersionControl indicates that when an item 210 is updated, whether or not the content server 15 should always generate a new version of an item, replace an existing item or based on the client input version flag to determine whether to generate a new version of an item or replace an existing item 210. VersionMax can assume several values. For example, VersionMax (0) has no upper limit; i.e., unlimited number of versions for an item 210 can be stored in the content manager library server 15. VersionMax (n) means that a maximum of (n) versions of an item 210 can be stored in the content manager library server 15. When system 10 updates an item 210, a new version is always created. If the total number of versions existing for an item 210 exceeds VersionMax(n), then the oldest version of the item 210 will automatically be deleted by system 10.

There exists a one-to-one relationship between an item instance 210 and the root component instance 215. There also exists a one-to-many relationship between the root component instance 215 (or the parent component instance) and the child component instances 220, 221. In addition, there may exist a one-to-many relationship between the child component instances 220, 221 and its own child (or grandchild) component instances 230, 231.

Thus, the valid action code for the root component 215 type can only be "replace" and the valid action code for the child component 220 type can be "add", "replace" or "delete".

When an item 210 is updated, any or all of the following scenarios may occur:

Replace the existing attribute values stored in the root component instance 215 for a specific item 210.

Replace the existing attribute values stored in a specified child component instance 220, 221 for the specific item 210.

Add a new child component instance 220, 221 into the hierarchical structure of the specific item 210.

Delete an existing child component instance 220, 221 from the hierarchical structure for the specific item 210.

Depending on the "versioning" configuration for the item 210 being updated, system 10 can either create a new version of the existing Item 210 or replace the specified version of the item 210 with the newly requested component. Due to the one-to-one relationship between an itemID and a Root ComponentID (i.e., the identification of the root component 215), when the appropriate API (application program interface) is invoked, the root component 215 can only be replaced. The child components 220, 221 can be added, replaced or deleted based on the input ActionCode.

Figure 3:
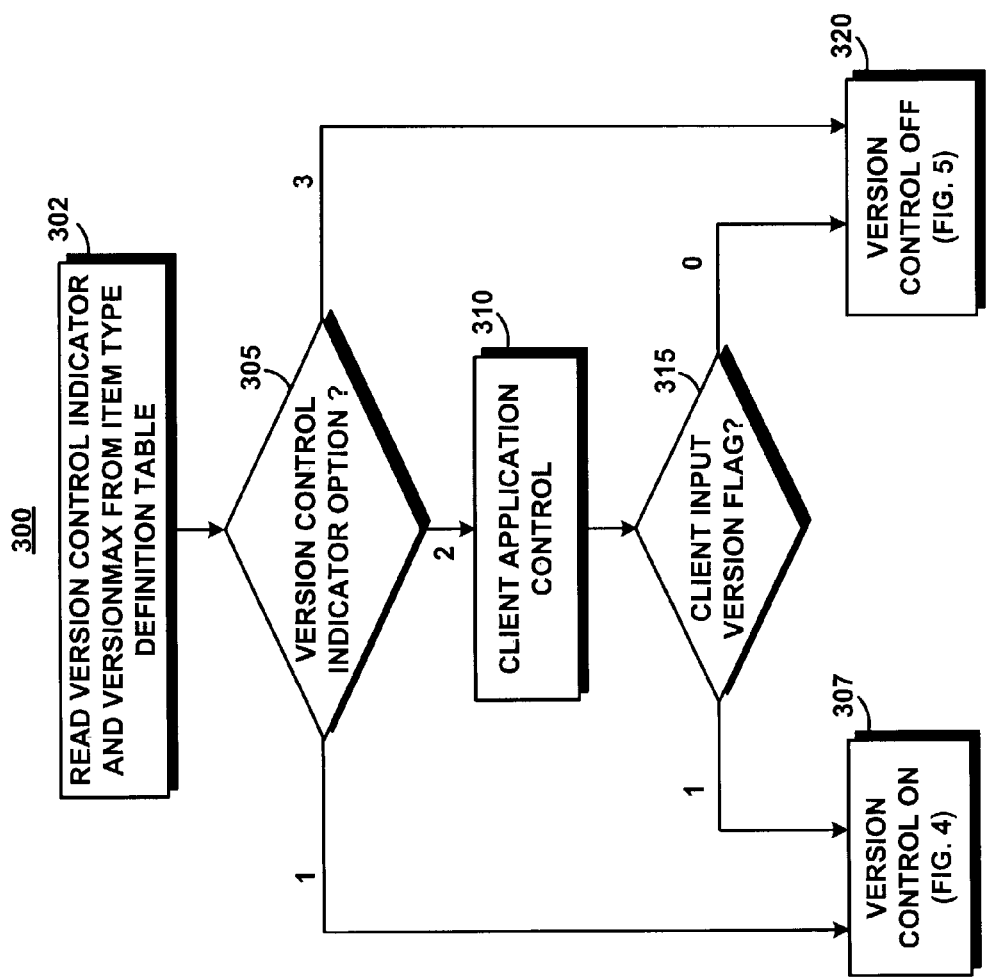
FIG. 3 is a flow chart that illustrates the logic flow for process version control according to the present invention.

The implementation of the version control for item 210 is based on the value of the version control values stored in an Item Type definition table of item type 200, as illustrated in FIG. 3. Possible scenarios are as follows:

1. Always create a new version when a document is updated;
2. allow the client application to specify whether or not (a) to replace the existing version of the document, or (b) to create a new version of the document upon request by the client or the client application; or
3. never make a new version; replace the existing version when a document is updated.

The number of each versioning scenario above is the version control indicator that is predefined by the client application in the Item Type definition table 200. If the version control indicator is set to either option 1 or 2, the number of versions stored in the content management library server for an item 210 is based on the value of the Version- Max (i.e., maximum number of versions selected by the client application) stored in the Item Type definition table 200.

Using parameters that have been predefined in the system 10, the stored procedure is able to either replace an existing version of a document item 210 or to create a new version of the updated document item 210. With reference to the process version control method 300 of FIG. 3, system 10 reads the version control indicator and the maximum number of allowed (or desired) versions from the Item Type definition table 200, at step 302.

If the version control indicator option is set to 1 at step 305, the version control is activated ("ON") at step 307 and completely implemented by system 10, transparently to the client application.

If, however, the version control option is set to 2 at step 305, then the client application retains versioning control at step 310, and reads the version flag from the client application. The version flag parameter specified by the client application at step 315 then determines whether to replace the specified version of the document at step 320, or to create a new version of the document at step 307.

If the version flag parameter specified by the client application at step 315 is set to 0, the version control is inactivated ("OFF") at step 320, and system 10 performs the logic flow of FIG. 5, as it will described later in more detail. If the version flag parameter specified by the client application at step 315 is set to 1, the version control is activated ("ON") at step 3070, and system 10 performs the logic flow of FIG. 4, as it will described later in more detail.

If the version control option is set to 3 at step 305, then the client application proceeds to step 320, inactivating the version control, as described earlier.

Figure 2:
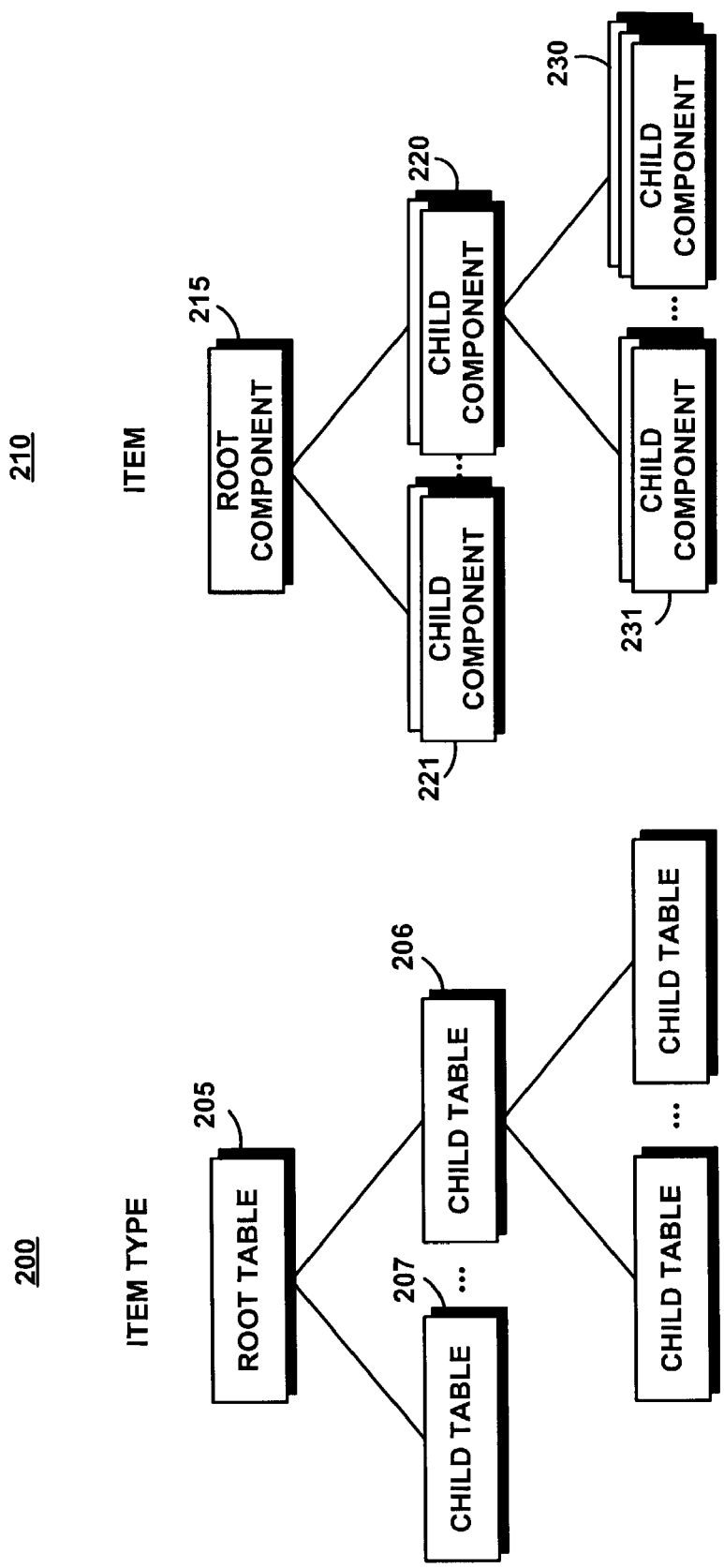
FIG. 2 is comprised of FIGS. 2A and 2B, and is an exemplary representation of the structure of an item type and an item as defined by the system of the invention.

With reference to FIG. 2, the API is designed to allow the client application to specify the changes to an item 210 in any of the Component Types. The client application can request that system 10 make any of the following changes without the knowledge of other child component 220 types:

1. replace a root component 215 or any of the child components 220, 221;
2. add a component instance to any child component 220, 221 type, or
3. delete a component instance from any child component 220, 221 type within the hierarchical structure.

Returning to FIG. 3, when an item 210 is updated and the version control is activated at step 307, a new version of the item 210 is then created by system 10. The new version of item 210 must include a new version of the entire hierarchical structure of item 210 with any modifications requested via the API. The system 10 stores a completely new version of the entire hierarchical structure of the same item 210, not just the changes to item 210.

Figure 4:
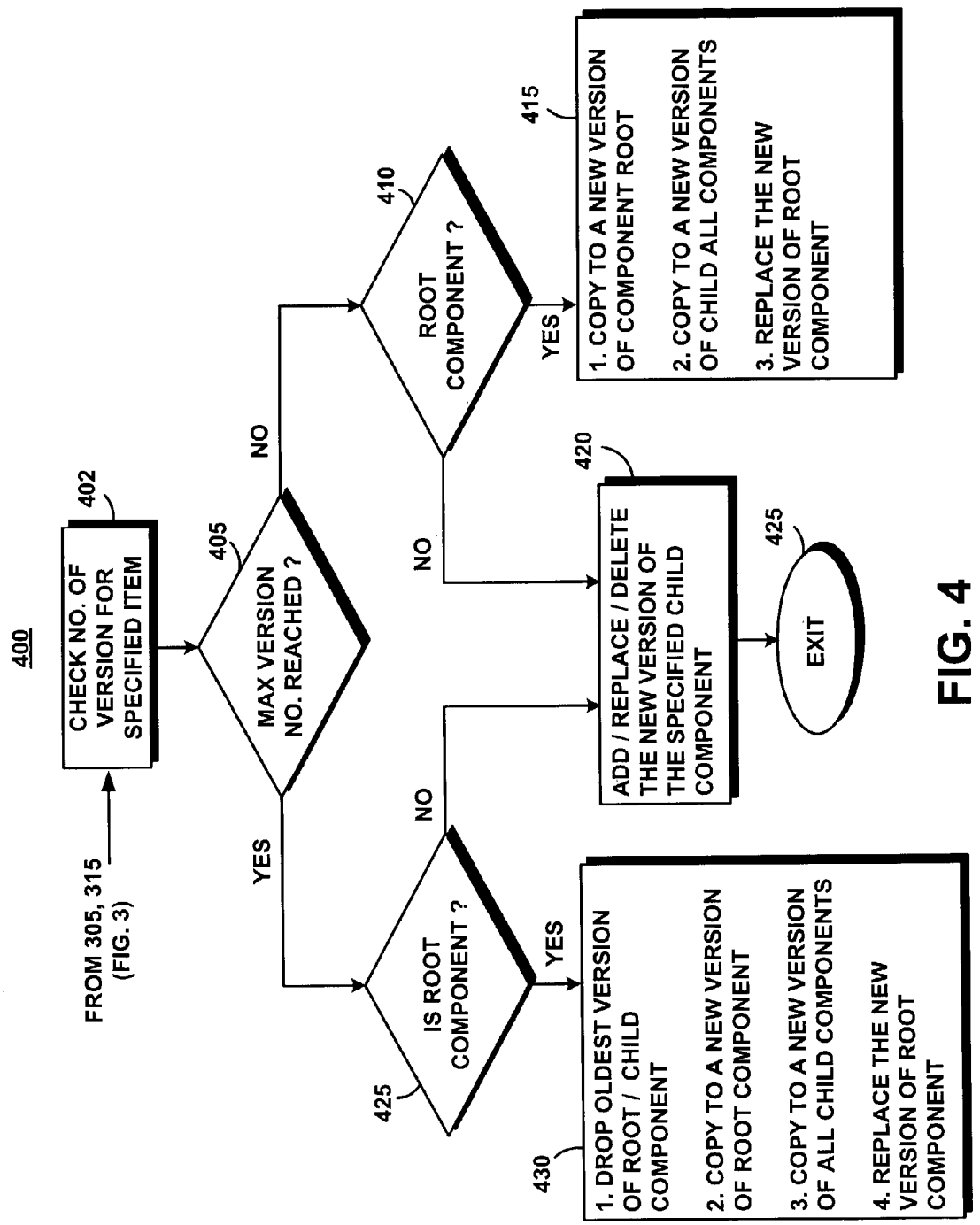
FIG. 4 is a flow chart that illustrates the logic flow for a process with the version control activated (i.e., "ON")

FIG. 4 illustrates a method 400 that describes the performance of system 10 when the version control is activated at step 307 of FIG. 3. At step 402, system 10 checks the number of versions that exist for the specified item 210, and then compares that number with a predefined maximum number (VersionMax) of items allowed, at step 405.

If no upper limit has been set, or the maximum number of versions has not been reached at step 405, system 10 checks whether the item is a root component 215 at step 410. If system 10 determines that the item is a root component 215, it performs the following functions at step 415:

1. Copy to a new version of the root component 215;
2. copy to a new version of all child components 220, 221; and
3. replace the new version of the root component 215.

If, however, system 10 determines that the item is not a root component 215, at step 410, but that the item is a child component 220, 221, system 10 performs any of the following functions at step 420: add; replace; or delete the new version of the specified child component 220, 221. System 10 then exits at step 425, having performed the required versioning functions.

Returning now to step 405, if system 10 determines that the maximum number of versions has been reached, it checks, at step 430, whether item 210 is a root component 215. If so, system 10 performs the following functions at step 435:

1. Drop the oldest version of root component 215 or child component 220, 221;
2. copy the specified version of a root component instance to a new version of the root component 215;
3. copy the specified version of all child component instances to a new version of all the child components 220, 221; and
4. replace the older version of the root component 215 with its new version.

If at step 425 system 10 determines that the item is a child component 220, 221, it executes the functions of step 420, as described earlier, and then exits at step 425.

Returning to step 320 of FIG. 3, with the versioning control for system 10 been inactivated, system 10 performs the logic flow of method 500 of FIG. 5. System 10 checks to if the item 210 is a root component 215 at step 504. If it is, system 10 replaces the root component of the specified item 210 at step 505 with the client input value, then exits at step 510, having performed the desired versioning functions. If system 10 determines at decision step 504 that item 210 is not a root component, system 10 either adds, replaces, or deletes the specified child component 220, 221 of item 210 with the client input value based on the client required action, at step 515, then exits at step 510.

It is to be understood that the specific embodiments of the invention that have been described are merely illustrative of certain application of the principle of the present invention. Numerous modifications may be made to the item versioning implementation in a content management system invention described herein without departing from the spirit and scope of the present invention. Moreover, while the present invention is described for illustration purpose only in relation to the WWW, it should be clear that the invention is applicable to any document routing system accessible either through an internet or intranet connection.

What is claimed is:

1. A computer-implemented method for item versioning in a database content management system that includes a plurality of tables, the method comprising:

acquiring a predetermined version control indicator of allowable versions for an entire hierarchical structure of an item type of one of the database tables, wherein the hierarchical structure comprises a root component and at least one child component;

updating an item that is an instance of the item type; and implementing version control of the item based on the version control indicator and attributes of the root and child components that are defined by the hierarchical structure of the item type;

wherein, upon updating the item, automatically creating a new version of the entire item, so that multiple versions of the item are maintained in the hierarchical structure of the item type;

wherein the multiple versions of the item share a single item identification, with each version being identified by a unique version number; and wherein each of the multiple versions of the item reflects a different version of the item and includes a corresponding version of the entire hierarchical structure of the item type.

2. The method of claim 1, further comprising predefining the version control indicator and a maximum number of allowable versions in an item type definition table for the entire hierarchical structure of the item type.

3. The method of claim 1, wherein implementing version control comprises updating the item by replacing existing attributes of a root component instance of the item.

4. The method of claim 1, wherein implementing version control comprises replacing existing attributes of a specific child component instance of the item.

5. The method of claim 1, wherein implementing version control comprises adding a new child component instance of the item into the hierarchical structure of the item type.

6. The method of claim 1, wherein implementing version control comprises deleting an existing child component instance of the item from the hierarchical structure of the item type.

7. A computer program product having a plurality of executable instructions stored on a computer usable medium, for item versioning in a content management system that includes a plurality of tables, the computer program product comprising:

a first set of program instructions that acquire a predetermined version control indicator and of allowable versions for an entire hierarchical structure of an item type of one of the database tables, wherein the hierarchical structure comprises a root component and at least one child component;

a second set of program instructions that update an item that is an instance of the item type; and a third set of program instructions that implement version control of the item based on the version control indicator and attributes of the root and child components that are defined by the hierarchical structure of the item type, wherein, upon updating the item, the third set of program instructions automatically creates a new version of the entire item, so that multiple versions of the item are maintained in the hierarchical structure of the item type;

wherein the multiple versions of the item share a single item identification, with each version being identified by a unique version number; and wherein each of the multiple versions of the item reflects a different version of the item and includes a corresponding version of the entire hierarchical structure of the item type.

8. The computer program product of claim 7, further comprising an item type definition table for the entire hierarchical structure of the item type that stores predefined version control indicator and a maximum number of allowable versions.

9. The computer program product of claim 7, wherein the third set of program instructions updates the item by replacing existing attributes of a root component instance of the item.

10. The computer program product of claim 7, wherein the third set of program instructions replaces existing attributes of a specific child component instance of the item.

11. The computer program product of claim 7, wherein the third set of program instructions adds a new child component instance of the item into the hierarchical structure of the item type.

12. The computer program product of claim 7, wherein the third set of program instructions deletes an existing child component instance of the item from the hierarchical structure of the item type.

13. A computer-implemented content management system that includes a piurality of tables, for item versioning, the system comprising:

means for acquiring a predetermined version control indicator of allowable versions for an entire hierarchical structure of an item type of one of the database tables, wherein the hierarchical structure comprises a root component and at least one child component;

means for updating an item that is an instance of the item type; and means for implementing version control of the item based on the version control indicator and attributes of the root and child components that are defined by the hierarchical structure of the item type;

wherein, upon updating the item, the means for implementing version control of the item automatically creates a new version of the entire item, so that multiple versions of the item are maintained in the hierarchical structure of the item type;

wherein the multiple versions of the item share a single item identification, with each version being identified by a unique version number; and wherein each of the multiple versions of the item reflects a different version of the item and includes a corresponding version of the entire hierarchical structure of the item type.

14. The content management system of claim 13, further comprising means for predefining the version control indicator and a maximum number of allowable versions in an item type definition table for the entire hierarchical structure of the item type.

15. The content management system of claim 13, wherein the implementing means updates the item by replacing existing attributes of a root component instance of the item.

16. The content management system of claim 13, wherein the implementing means replaces existing attributes of a specific child component instance of the item.

17. The content management system of claim 13, wherein the implementing means adds a new child component instance of the item into the hierarchical structure of the item type.

18. The content management system of claim 13, wherein the implementing means deletes an existing child component instance of the item into the hierarchical structure of the item type.

* * * * *